United States Patent
Pan et al.

(10) Patent No.: US 7,461,433 B2
(45) Date of Patent: Dec. 9, 2008

(54) TORQUE-CONTROLLED ROTATIONAL MODULE

(75) Inventors: Hung-Tsai Pan, Taipei (TW); Po-Lang Hsu, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 572 days.

(21) Appl. No.: 11/105,456

(22) Filed: Apr. 14, 2005

(65) Prior Publication Data

US 2005/0263664 A1    Dec. 1, 2005

(30) Foreign Application Priority Data

May 25, 2004    (TW)    ............................. 93114820 A

(51) Int. Cl.
*E05D 11/06* (2006.01)
(52) U.S. Cl. .......................... 16/374; 16/340
(58) Field of Classification Search ................. 174/480, 174/280; 248/291.1, 291.11, 291.13, 608, 248/478, 183.3, 183.4, 476, 71, 73; 16/337–340, 16/374, 367; 362/427
See application file for complete search history.

(56) References Cited

U.S. PATENT DOCUMENTS

| | | | | |
|---|---|---|---|---|
| 2,732,751 A | * | 1/1956 | Heidecke et al. | 396/530 |
| 3,028,619 A | * | 4/1962 | Schlage et al. | 16/49 |
| 3,604,923 A | * | 9/1971 | Moffatt | 362/427 |
| 4,333,132 A | * | 6/1982 | Paley | 362/421 |
| 4,527,225 A | * | 7/1985 | Hartman | 362/294 |
| 4,565,395 A | * | 1/1986 | Rockwood et al. | 285/282 |
| 4,661,895 A | * | 4/1987 | Hull | 362/427 |
| 5,504,665 A | * | 4/1996 | Osteen et al. | 362/287 |
| 5,683,171 A | * | 11/1997 | Van Gennep | 362/191 |
| 5,940,936 A | * | 8/1999 | Lu | 16/337 |
| 6,018,847 A | * | 2/2000 | Lu | 16/337 |
| 6,092,778 A | * | 7/2000 | Lang et al. | 248/478 |
| 7,044,676 B2 | * | 5/2006 | Schuurmans | 403/92 |
| 7,146,684 B2 | * | 12/2006 | Hirtsiefer | 16/339 |
| 2004/0139578 A1 | * | 7/2004 | Yang et al. | 16/337 |

* cited by examiner

*Primary Examiner*—Victor Batson
*Assistant Examiner*—Emily M Morgan
(74) *Attorney, Agent, or Firm*—Rabin & Berdo, PC

(57) ABSTRACT

A torque-controlled rotational module is described. The torque-controlled rotational module has a fixing base, a rotational member, a spring member, and a torque adjusting ring. The fixing base further has a fixing wall and a cable hole therein for a cable to pass therethrough. The module further utilizes wear-resisting members configured on both sides of the rotational member, between the torque adjusting ring and the fixing base, to protect the torque adjusting ring and the fixing base from wear and tear. The fixing wall further utilizes a fixing indentation to couple to arresting protrusions of the wear-resisting members to avoid rotation of the wear-resisting members. The fixing base further utilizes a knob coupled to a slot of the rotational member to limit a rotational angle of the rotational member.

16 Claims, 3 Drawing Sheets

TORQUE-CONTROLLED ROTATIONAL MODULE

RELATED APPLICATIONS

The present application is based on, and claims priority from, Taiwan Application Serial Number 93114820, filed May 25, 2004, the disclosure of which is hereby incorporated by reference herein in its entirety.

FIELD OF THE INVENTION

The present invention generally relates to a rotational module. More particular, the present invention relates to a torque-controlled rotational module.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, mobile phones, video cameras, personal digital assistants, desktop computer displays, multimedia televisions and various consumer electronics, and are gradually replacing the cathode ray tubes (CRT) used in conventional displays. LCDs are becoming the mainstream display apparatus.

Generally, the liquid crystal display of the notebook computer is disposed in the upper cover of the notebook computer. The upper cover is opened to reveal the hidden liquid crystal display while using the notebook computer. The upper cover is rotatably coupled to a base of the notebook computer by a rotational shaft. Therefore, the notebook computer liquid crystal display can be adjusted to a desired angle together with the upper cover.

The multimedia television, the desktop computer display, or other display is also rotated with a rotational shaft for coupling the display portion to the base portion thereof, thus allowing users to watch from different angles. Accordingly, a user can enjoy watching images on a rotatable display from different angles and positions.

However, if a torque for rotating the rotational shaft is too strong, the display is difficult to rotate. If the torque for rotating the rotational shaft is too weak, an undesired rotation of the display may occur, and may even prevent the display from being effectively fixed in the desired direction, position, and angle so as to inconvenience the user watching the images on the display.

The rotational shaft of some conventional displays is fixed at a predetermined angle by a fixing device when the display is rotated to the predetermined angle to demonstrate the images for watching. An undesired rotation of the display may be avoided. However, a complicated process for adjusting the angle of the display to a desired angle is incurred. The fixing device has to be released first, the display is then rotated, and subsequently the rotational shaft is locked again by the fixing device when a user wishes to change the angle of the display.

For improving the inconvenience in adjusting the angle of the display, some conventional rotational shafts of the display includes torque-controlled springs to control the rotational torque for the rotational shaft. However, if the torque is not correct, an operator must disassemble the rotational shaft from the display and readjust the torque of the rotational shaft. Sometimes, the operators must separate the rotational shaft from the base of the display and reassemble the rotational shaft and the display. Therefore, the conventional display shaft cannot provide a convenient assembly process for assembling the displays such that the complicated assembly process causes a bottleneck in manufacturing and assembling the displays.

SUMMARY OF THE INVENTION

It is an object of the present invention to provide a rotational module with a predetermined controlled torque conveniently to position a display at a desired angle.

It is another object of the present invention to provide a rotational module that is adjustable and with a predetermined controlled torque thereof confirmed prior to assembly with the display so that the display may instantly work at the predetermined controlled torque after assembly of the display with the rotational module.

To accomplish the above objectives, the present invention provides a torque-controlled rotational module for a display or an electrical apparatus requiring a rotational function with a steady torque, and that avoids an unexpected rotation. The torque-controlled rotational module has a fixing base, a rotational member, a spring member, and a torque adjusting ring.

The fixing base further has a fixing wall and the interior of the fixing wall is formed with a cable hole through which a cable passes. The rotational member couples to the fixing base and surrounds the fixing wall. The spring member is disposed on one side of the rotational member. The torque adjusting ring presses on the spring member for adjusting a rotational torque of the rotational member.

The torque-controlled rotational module further includes wear-resisting members disposed on both sides of the rotational member, and between the fixing base and the torque adjusting ring, to avoid abrasions of the torque adjusting ring and the fixing base in use.

The fixing wall of the fixing base further has a fixing indentation, and the wear-resisting members further have arresting protrusions for coupling to the fixing indentation to avoid relative motion therebetween. Similarly, the spring member may further have an arresting protrusion for coupling to the fixing indentation to avoid a rotation thereof.

The rotational member further includes a plurality of first fixing holes to couple to a rotational portion of a display, and the fixing base further includes a plurality of second fixing holes to couple to a fixed portion of the display. The fixing base further utilizes a knob and the rotational member further includes a slot coupling to the knob. Accordingly, the knob moves in the slot so as to limit a rotational angle of the rotational member.

The torque-controlled rotational module according to the present invention can adjust and confirm the rotational torque prior to assembly with a display or any other electrical apparatus. Accordingly, the assembly quality and yield of the display and/or the electrical apparatus with the torque-controlled rotational module can increase. Additionally, users can easily rotate the display and the electrical apparatus with the torque-controlled rotational module under the confirmed rotational torque. The torque-controlled rotational module can effectively limit the rotational angle of the display and the electrical apparatus in use so as to increase the stability thereof.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
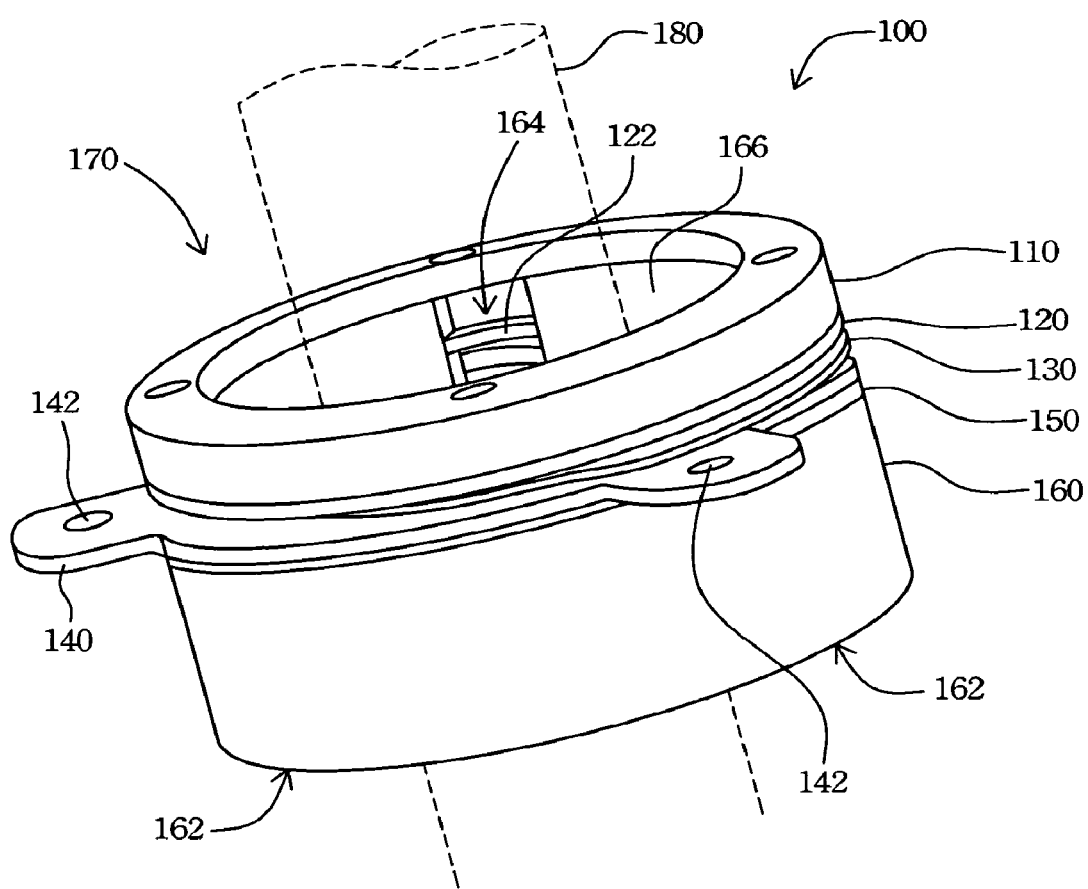
FIG. 1 is a schematic perspective view of a rotational module according to the present invention.

FIG. 1 is a schematic perspective view of a rotational module according to the present invention. The rotational module according to the present invention is a torque-controlled rotational module 100. The torque-controlled rotational module 100 includes a torque adjusting ring 110, a wear-resisting member 120, a spring member 130, a rotational member 140, a wear-resisting member 150, and a fixing base 160. The fixing base 160 has a fixing wall 166 and a cable hole 170. The fixing wall 166 further has a fixing indentation 164 thereon and the cable hole 170 is disposed inside the fixing wall 166.

The rotational member 140 surrounding the fixing wall 166 is configured on and coupled to the fixing base 160. The spring member 130 is disposed on one side of the rotational member 140. The torque adjusting ring 110 couples to the fixing wall 166 of the fixing base 160 to set up a predetermined torque for the torque-controlled rotational module 100. When a gap between the torque adjusting ring 110 and the fixing base 160 is smaller, that is to say, the deformation of the spring member 130 is more serious, the predetermined torque for rotating the rotational member 140 of the torque-controlled rotational module 100 is higher. Otherwise, when the gap between the torque adjusting ring 110 and the fixing base 160 is larger, that is to say, the deformation of the spring member 130 is lighter, the predetermined torque for rotating the rotational member 140 of the torque-controlled rotational module 100 is lower.

Accordingly, the predetermined torque for rotating the rotational member 140 of the torque-controlled rotational module 100 can be set up at this moment and tested immediately when the rotational module is just assembled. If the torque for rotating the rotational member 140 is too high, the gap between the torque adjusting ring 110 and the fixing base 160 is adjusted to enlarge the gap in the axial direction and reduce the torque value. Contrarily, if the torque for rotating the rotational member 140 is too low, the gap between the torque adjusting ring 110 and the fixing base 160 is adjusted to reduce the gap in the axial direction and increase the torque value. For example, the torque adjusting ring 110 can be coupled to the fixing base 160 with a screw and the gap between the fixing base 160 and the torque adjusting ring 110 can be adjusted by rotating the screw in the axial direction of the torque-controlled rotational module 100.

A wear-resisting member 120 and a wear-resisting member 150 are disposed on the outsides of the spring member 130 and the rotational member 140 to avoid wearing the torque adjusting ring 110 and the fixing base 160 while rotating the rotational member 140. The wear-resisting member 120 and the wear-resisting member 150 can also be disposed on both sides of the rotational member 140 and the spring member 130 is disposed on the outside of the wear-resisting member 120 or the wear-resisting member 150 so that the spring member 130 can press the rotational member 140 via the wear-resisting member 120 or the wear-resisting member 150 to adjust the torque for rotating the rotational member 140. The rotational torque can also be generated by a plurality of spring members 130 disposed on one or both sides of the rotational member 140.

The wear-resisting member 120 and the wear-resisting member 150 further include arresting protrusions 122 for coupling to a fixing indentation 164 on the fixing wall 166 of the fixing base 160 to avoid rotating and wearing the wear-resisting member 120 and the wear-resisting member 150 while rotating the rotational member 140. Therefore, the wear-resisting member 120 and the wear-resisting member 150 can avoid a relative motion between the torque adjusting ring 110 and the fixing base 160. Accordingly, the torque-controlled rotational module 100 can effectively avoid a rotation of the torque adjusting ring 110 to change the torque value while rotating the rotational member 140. Further, the arresting protrusion can also be designed on the spring member 130 to avoid a relative motion between the spring member 130 and the fixing base 160.

The rotational member 140 further includes fixing holes 142 for coupling to a rotational portion of a display or the like. The fixing base 160 further includes fixing holes 162 for coupling to a fixed portion of the display or the like. A cable hole 170 is disposed in the interior of the torque-controlled rotational module 100 to allow a signal cable and/or a power cable, for example, a cable 180, to pass therethrough so that the signal and power transmission thereof are more safe and the appearance of the display is more elegant.

Figure 2:
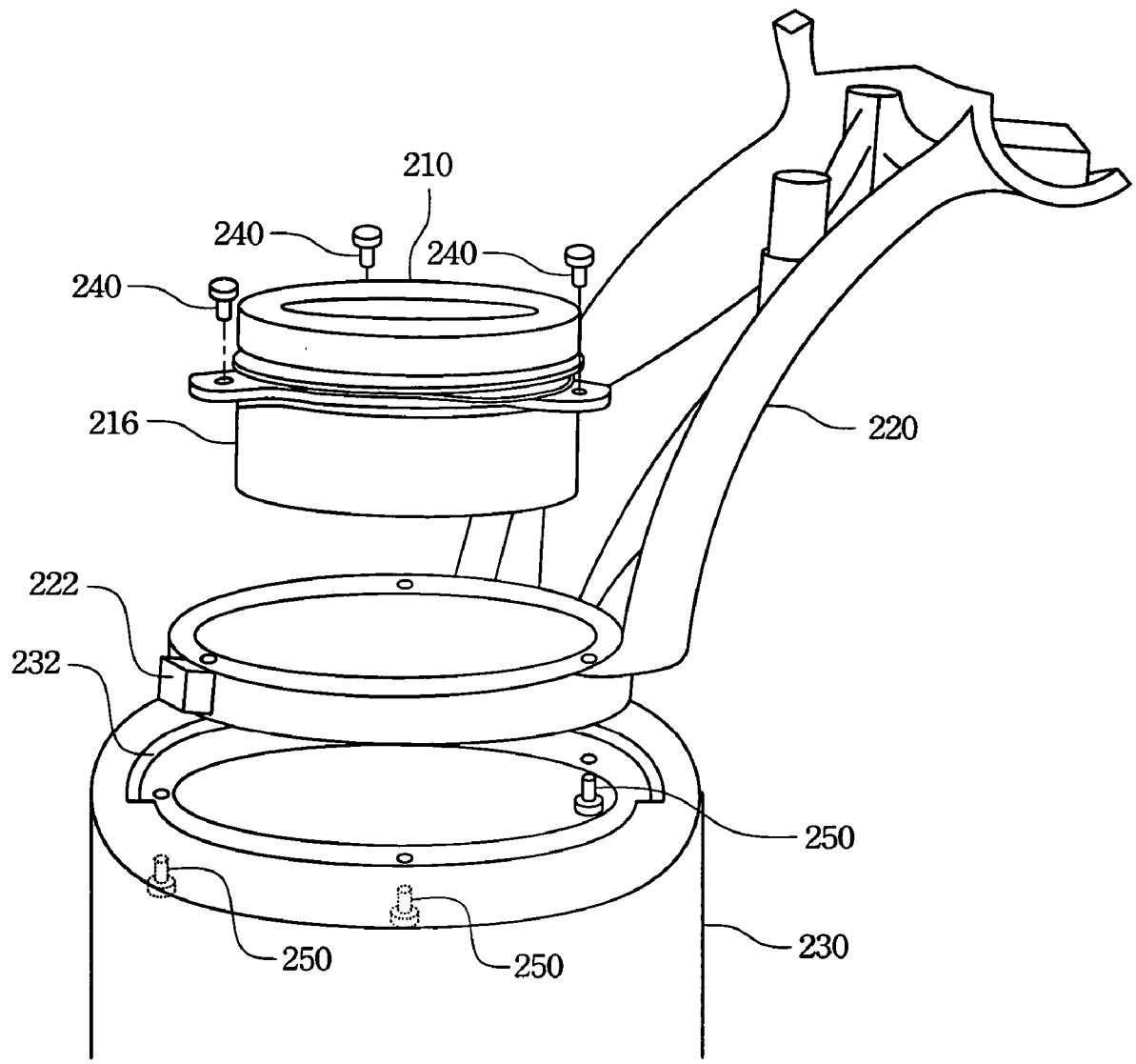
FIG. 2 is a preferred embodiment of a rotational module according to the present invention.

FIG. 2 illustrates a preferred embodiment of a rotational module according to the present invention. The preferred embodiment is a rotational frame of a display. The display rotational frame has a rotational portion 220 and a fixed portion 230, and a torque-controlled rotational module 210 coupling the two portions together. Therefore, the rotational portion 220 can rotate on the fixed portion 230. A user can rotate the rotational portion 220 with a predetermined torque value because the torque-controlled rotational module 210 is already set up according to the predetermined torque so that an unexpected rotation of the rotational portion 220 can be avoided and a stability of the display can be achieved.

Because the predetermined torque of the torque-controlled rotational module 210 is already set up while assembling the rotational module 210, the yield and quality of the assembly of the rotational portion 220 and the fixed portion 230 are therefore increased. The operators for assembling displays can easily assemble the displays without worrying about a wrong rotational torque of the display discovered after assembly of the display. A disassembly of the rotational portion and the fixed portion for readjusting the rotational torque of the display can thus be avoided.

Fixing devices 240 effectively coupling the torque-controlled rotational module 210 to the rotational portion 220 have no influence on the predetermined rotational torque of the torque-controlled rotational module 210. Similarly, fixing devices 250 effectively coupling the fixing base 216 of the torque-controlled rotational module 210 to the fixed portion 230 have no influence on the predetermined rotational torque of the torque-controlled rotational module 210. Therefore, the torque-controlled rotational module 210 can couple the rotational portion 220 to the fixed portion 230 quickly and stably. The fixing devices 240 and the fixing devices 250 are preferably, for example, screws or rivets. The rotational portion 220 can further utilize a knob 222 to couple to a slot 232 of the fixed portion 230 so that a rotational angle of the rotational portion 220 can be controlled by the slot 232 for limiting the display rotation to a predetermined angle.

Figure 3:
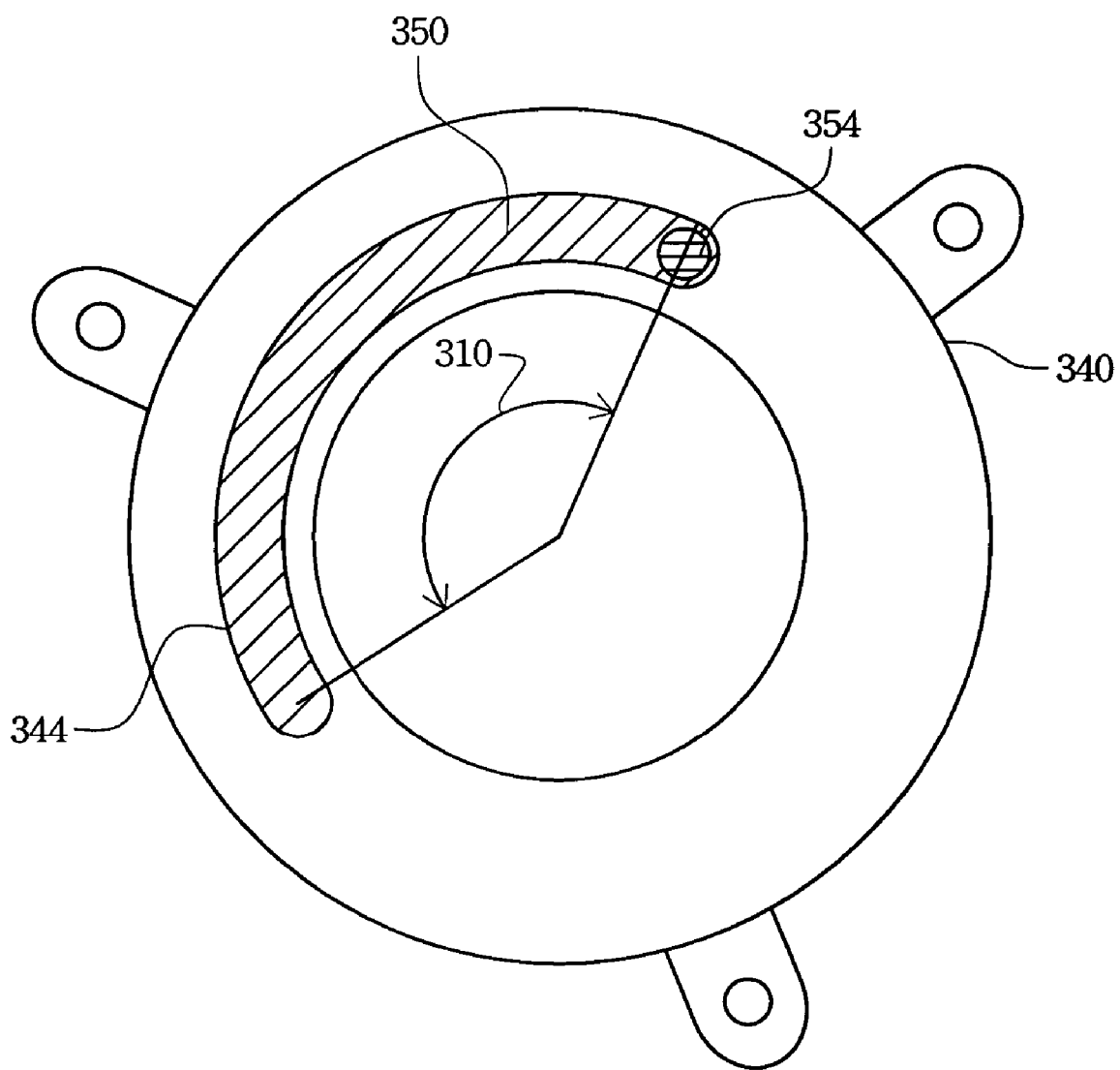
FIG. 3 is a preferred embodiment of an angle limitation mechanism of a rotational module according to the present invention.

The torque-controlled rotational module according to the present invention can also utilize an angle limitation mechanism to limit the rotational angle of the torque-controlled rotational module. Referring to FIG. 3, a preferred embodiment of an angle limitation mechanism of a rotational module according to the present invention is illustrated. The fixing base 350 is configured under the rotational member 340, and the rotational member 340 further includes a slot 344 coupling to a knob 354 of the fixing base 350. The slots 344 effectively limit the knob 354 to the rotational angle 310 when the rotational member 340 is rotating so that the rotational member 340 and the rotational module according to the present invention are limited to rotate within the rotational angle 310.

The torque-controlled rotational module according to the present invention can effectively maintain a rotational torque for a display and allows convenient rotation of the display. Furthermore, the torque-controlled rotational module can provide an easy and quick manufacturing process for operators to assemble the display with a correct, predetermined rotational torque. Therefore, quality and yield of the display assembly are both increased. The torque-controlled rotational module according to the present invention can further effectively limit the rotational angle of the display or the like so as to enhance the stability thereof.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A torque-controlled rotational module, comprising:
    a fixing base with a fixing wall, an interior of the fixing wall forming a cable hole for a cable to pass therethrough;
    a rotational member coupling to the fixing base and surrounding the fixing wall;
    a spring member disposed on one side of the rotational member; and
    a torque adjusting ring coupling to the fixing wall of the fixing base and pressing on the spring member for adjusting a rotational torque of the rotational member, wherein the rotational member further comprises a plurality of first fixing holes to couple to a rotational portion of a display, and the fixing base further comprises a plurality of second fixing holes to couple to a fixed portion of the display.

2. The torque-controlled rotational module of claim 1, further comprising a first wear-resisting member disposed between the torque adjusting ring and the rotational member to avoid an abrasion of the torque adjusting ring.

3. The torque-controlled rotational module of claim 2, further comprising a second wear-resisting member disposed between the fixing base and the rotational member to avoid an abrasion of the fixing base.

4. The torque-controlled rotational module of claim 3, wherein the fixing wall of the fixing base further comprises a fixing indentation, and the first wear-resisting member and the second wear-resisting member further comprise first arresting protrusions for coupling to the fixing indentation to avoid relative motion between the first wear-resisting member, the second wear-resisting member and the fixing base.

5. The torque-controlled rotational module of claim 4, wherein the spring member further comprises a second arresting protrusion for coupling to the fixing indentation to avoid relative motion between the spring member and the fixing base.

6. The torque-controlled rotational module of claim 1, wherein the fixing base further comprises a knob and the rotational member further comprises a slot coupling to the knob, wherein the knob moves in the slot so as to limit a rotational angle of the rotational member.

7. A display rotational frame, comprising:
    a rotational portion for supporting a display panel;
    a fixed portion for supporting the rotational portion and the display panel;
    a cable coupled to the display panel on the rotational portion through the fixed portion; and
    a torque-controlled rotational module coupling the rotational portion to the fixed portion so as to rotate the rotational portion on the fixed portion, wherein the torque-controlled rotational module further comprises:
        a fixing base with a fixing wall, an interior of the fixing wall forming a cable hole for the cable to pass therethrough;
        a rotational member coupling to the fixing base and surrounding the fixing wall;
        a spring member disposed on one side of the rotational member; and
        a torque adjusting ring coupling to the fixing wall of the fixing base and pressing on the spring member for adjusting a rotational torque of the rotational member, wherein the rotational member further comprises a plurality of first fixing holes to couple to the rotational portion, and the fixing base further comprises a plurality of second fixing holes to couple to the fixed portion.

8. The display rotational frame of claim 7, further comprising a first wear-resisting member disposed between the torque adjusting ring and the rotational member to avoid an abrasion of the torque adjusting ring.

9. The display rotational frame of claim 8, further comprising a second wear-resisting member disposed between the fixing base and the rotational member to avoid an abrasion of the fixing base.

10. The display rotational frame of claim 9, wherein the fixing wall of the fixing base further comprises a fixing indentation, and the first wear-resisting member and the second wear-resisting member further comprises first arresting protrusions for coupling to the fixing indentation to avoid relative motion between the first wear-resisting member, the second wear-resisting member and the fixing base.

11. The display rotational frame of claim 10, wherein the spring member further comprises a second arresting protrusion for coupling to the fixing indentation to avoid relative motion between the spring member and the fixing base.

12. The display rotational frame of claim 7, wherein the fixing base further comprises a knob and the rotational member further comprises a slot coupling to the knob, wherein the knob moves in the slot so as to limit a rotational angle of the rotational member.

13. A torque-controlled rotational module, comprising:
    a fixing base with a fixing wall, an interior of the fixing wall forming a cable hole for a cable to pass therethrough;
    a first wear-resisting member coupling to the fixing base and surrounding the fixing wall;

a rotational member coupling to the first wear-resisting member;

a spring member disposed on one side of the rotational member;

a torque adjusting ring coupling to the fixing wall of the fixing base and pressing on the spring member for adjusting a rotational torque of the rotational member; and a second wear-resisting member disposed between the torque adjusting ring and the rotational member to avoid an abrasion of the torque adjusting ring, wherein the rotational member further comprises a plurality of first fixing holes to couple to a rotational portion of a display, and the fixing base further comprises a plurality of second fixing holes to couple to a fixed portion of the display.

14. The torque-controlled rotational module of claim 13, wherein the second wear-resisting member is disposed between the spring member and the torque adjusting ring.

15. The torque-controlled rotational module of claim 13, wherein the fixing wall of the fixing base further comprises a fixing indentation, and the first wear-resisting member and the second wear-resisting member further comprise first arresting protrusions for coupling to the fixing indentation to avoid relative motion between the first wear-resisting member, the second wear-resisting member and the fixing base.

16. The torque-controlled rotational module of claim 13, wherein the fixing base further comprises a knob and the rotational member further comprises a slot coupling to the knob, wherein the knob moves in the slot so as to limit a rotational angle of the rotational member.

* * * * *